T. A. ARTHUR.
HOSE COUPLING AND TURN PLUG.
APPLICATION FILED SEPT. 10, 1908.
938,297.
Patented Oct. 26, 1909.
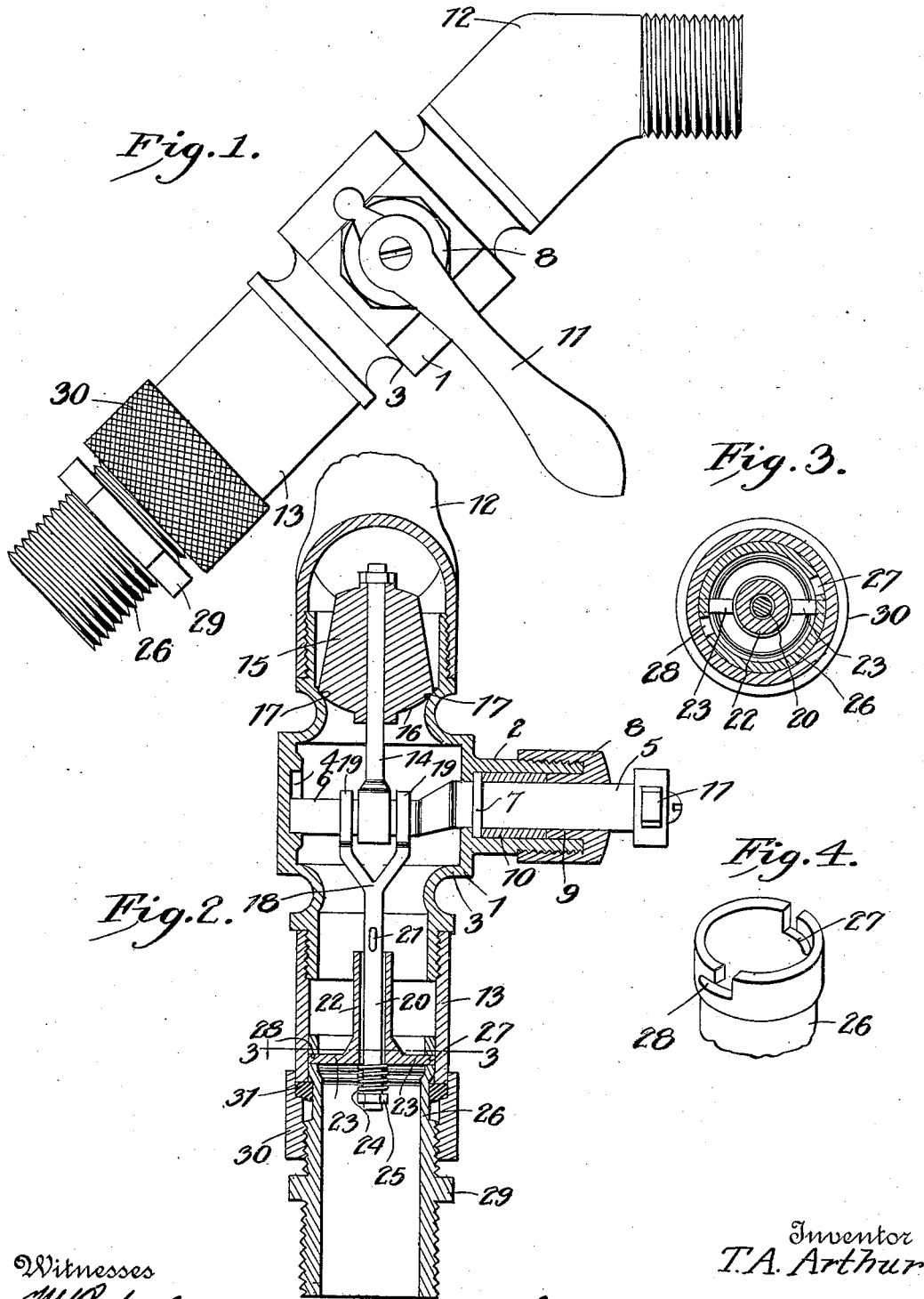

UNITED STATES PATENT OFFICE.

THOMAS A. ARTHUR, OF LOS ANGELES, CALIFORNIA.

HOSE-COUPLING AND TURN-PLUG.

938,297.  Specification of Letters Patent.  Patented Oct. 26, 1909.

Application filed September 10, 1908. Serial No. 452,484.

*To all whom it may concern:*

Be it known that I, THOMAS A. ARTHUR, a citizen of the United States, residing at Los Angeles, in the county of Los Angeles and State of California, have invented certain new and useful Improvements in Hose-Couplers and Turn-Plugs; and I do declare the following to be a full, clear, and exact description of the invention, such as will enable others skilled in the art to which it appertains to make and use the same.

This invention contemplates the construction of a simple and efficient coupler provided with means for controlling the passage of fluid.

One of the objects of this invention is the construction of a hose coupler having means for quickly connecting the sections of a hose and opening a fluid circuit operated practically simultaneously.

Another object of this invention is the construction of a hose coupler for quickly connecting the sections of a hose provided with means for turning on water for the hose, said means being so arranged that its operation will tightly connect the hose sections.

Another object of this invention is the construction of a combined coupler and turning plug having a leverage movement which may be operated by a handle and so arranged that one section of the hose may be connected to a second section and that simultaneously water or other fluid may be turned on and the joint of the connection will be made fluid-tight.

A still further object of the invention is the construction of a hose coupling made of a few simple parts and so arranged that two sections of a hose may be quickly coupled together and a water-tight and interlocking joint made between the two sections.

With these and other objects in view, the invention consists of certain novel features of construction, combination and arrangement of parts as will be described and particularly pointed out in the appended claims, and in the drawings, in which, Figure 1 is a side elevation of my improved combined coupler and turning plug; Fig. 2 is a vertical sectional view thereof; Fig. 3 is a horizontal sectional view taken on the line 3—3 of Fig. 2; Fig. 4 is a detail perspective view of a coupler member.

In the drawings, 1 indicates a casing arranged to receive the main operating parts of my improved mechanism. The casing 1 is formed with a projection, 2, having an opening extending therethrough, said projection extending at right-angles to the body portion of the casing. An internal shoulder 3 is formed on the casing at a point where the projection 2 begins, and a recess, 4, is formed on the opposite inner side of said casing. A lever, 5, formed with a bent end portion, 6, and a shoulder, 7, extends through the projection, 2, and has its inner end arranged to be seated in the recess, 4. The lever 5 is secured on the casing 1, by means of an internally threaded nut, 8, which is formed with an internal sleeve, 9, and said nut is threaded to the end of the projection, 2. A gasket, 10, is positioned around the lever, 5, and between the shoulder, 7, and the sleeve, 9, said lever 5 being provided with a handle, 11.

The ends of the casing, 1, are threaded and a tail-piece, 12, formed in the manner of an elbow, is connected to one of said ends, and a second tail-piece, 13, is connected to the other of said ends. The lever, 5, is arranged to operate a plug stem, 14, which is mounted thereon and which extends in a line parallel to the axis of the casing, 1, and is provided with a plug, 15, which is secured to the end of said stem. The plug, 15, is formed with a rounded end, 16, and said end is arranged to be seated on a rounded shoulder, 17, formed in the casing, 1. The lever, 5, also connects with a coupler-operating stem, 18, which is loosely mounted by means of lugs, 19, on the bent end of the lever, 5. The coupler operating stem is formed with a squared end, 20, and is provided with lateral studs, 21. The stem, 18, extends through an opening formed in a clutch, 22, which is provided with pins, 23, extending laterally from said clutch. Mounted on the lower end of the coupler operating stem, 20, is a spring, 24, which is secured thereto by a nut, 25. The spring, 24, is adapted to normally press against the lower side of the clutch 22, and compensates the movement of the lever, 5.

A threaded sleeve or upper section, 26, is adapted to be connected to the pins, 23, and for this purpose said coupler section is formed with a plurality of end slots, 27 and 28, which extend for a part of their length in a line parallel to the axis of said coupler section, and for the remainder of their length at right-angles to their inner portions. The coupler section, 26, is preferably formed with a nut, 29, and provided with screw threads on either side of the nut. The slotted end of the coupler section is slightly enlarged to fit snugly against the inner periphery of the section, 13, and said slotted end is adapted to be interlocked with the pins, 23, and clutch, 22. The coupler section, 26, is provided with an adjustable nut, 30, which is beveled in an outline direction internally and thinned on one of its ends to embrace the end of section, 13. A beveled rubber washer, 31, is mounted on the coupler section, 26, below the enlarged end and is adapted to be forced or pressed against the end of section, 13, near the pins, 23, interlocking with the end of the coupler section, 26, and the screw, 30, is threaded tightly against the bevel edges of said washer.

The coupler sections, 12 and 26, are normally secured to the ends of two hose sections and the casing 1 is adapted to be connected to the angular section, 12. When it is desired to connect the two hose sections together, the section, 26, is inserted within the end of section, 13, and the slotted end of said section is interlocked with the pins, 23. Simultaneously with this movement the handle, 11, is turned, thereby pulling the adjustable nut, 30, against the washer 31, and extending the plug, 15, from its seat. When so extended the water will freely flow through the section, 12, across the end, 6, of lever, 5, and through the sections, 12 and 26, of the connecting hose to its outlet point. The gasket 10 will prevent water from discharging against the handle 11 and the rubber washer, 31, will positively close the connection between the sections 13 and 26. The coupler operating stem 18 is prevented by the studs 21 and the squared end, 20, from being displaced. When it is desired to disconnect the two sections of the hose, the handle, 11, is turned so as to bring the plug, 15, against the seat, and by loosening the connection between the pins, 23 and the coupler section, 26, to allow of the ready removal of said section, which is effected by simply turning the end of the same and pulling it away from the sections, 13. The outer ends of the sections, 12 and 26, may be corrugated or formed with screw threads to receive the ends of the hose.

My improved device is particularly adapted for use in connection with fire departments and such institutions, which require the rapid handling of hose sections, and by means of this device an operator is enabled to quickly connect the various sections of a hose and to immediately open the current of the fluid to be discharged. Should an operator desire to quickly shut off the water or fluid passing through the hose section provided with my improved device, he may instantly do so by turning the handle, 11, and with this turning he may disconnect the sections of the hose by a simple turn of the wrist. The construction of the device is such that a tight joint is quickly formed between the different hose sections and the water or fluid turned on in one operation.

It is well known that the connections between hose sections soon become loosened through frequent use, and, owing to the defective adjustment of the various devices employed to connect the various hose sections, the joints soon become impaired, and water escapes therefrom, resulting very often in great loss and delay. With my improved device a tight joint is always assured by means of the interlocking sections and the adjustable screw, together with the leverage movement, for positively connecting the hose sections together. The spring, 24, allows for further adjustment after the hose connection is made water-tight and tends to relieve the bent end of the lever 5 from any undue strain.

Having thus described my invention, what I claim as new and desire to secure by Letters-Patent, is:

1. A casing arranged to seat a plug, said casing being formed with a lateral projection through which a lever is arranged to extend, a lever extending through the projection and having connections with the plug, a coupler stem having connections with the lever, means for securing the lever on the casing, a clutch mounted on the coupler stem, said clutch being formed with lateral pins, and a hose section arranged to interlock with the clutch.

2. A casing formed with a rounded internal shoulder arranged to seat a plug, a lever extending through the casing, and having its inner end seated in a recess formed in the casing, means for securing the lever on the casing, a plug provided with a stem having connections with the lever, a stem having lugs mounted on the lever, a clutch mounted on the stem, an equalizing spring mounted on the stem and pressing against the clutch, a hose section formed with a plurality of slots arranged to interlock with the pins of the clutch, an adjustable nut threaded on the hose section, a beveled washer seated between the nut and against a hose section having connections with the casing, and a handle for operating the lever.

In testimony whereof I have hereunto set my hand in presence of two subscribing witnesses.

THOMAS A. ARTHUR.

Witnesses:
JOHN WIEDENBECK,
LOU. B. JACKSON.